G. COUSINS.
SPACER BOLT.
APPLICATION FILED MAY 8, 1913.

1,108,888.

Patented Sept. 1, 1914.

WITNESSES
E. W. Callaghan
C. E. Trainor

INVENTOR
GEORGE COUSINS,
BY Munn & Co.
ATTORNEYS

UNITED STATES PATENT OFFICE.

GEORGE COUSINS, OF OSWEGO, NEW YORK.

SPACER-BOLT.

1,108,888.  Specification of Letters Patent.  Patented Sept. 1, 1914.

Application filed May 8, 1913. Serial No. 766,371.

*To all whom it may concern:*

Be it known that I, GEORGE COUSINS, a citizen of the United States, and a resident of Oswego, in the county of Oswego and State of New York, have made certain new and useful Improvements in Spacer-Bolts, of which the following is a specification.

My invention is an improvement in spacer bolts, and has for its object to provide a bolt of the character specified, by means of which, walls, as for instance the walls for concrete forms may be held in spaced relation by means of a single bolt, which engages both walls positively, and firmly holds the two walls from lateral movement toward or from each other, and so arranged that the bolt may be applied and removed, in a minimum of time, and with a minimum of labor.

Figure 1:
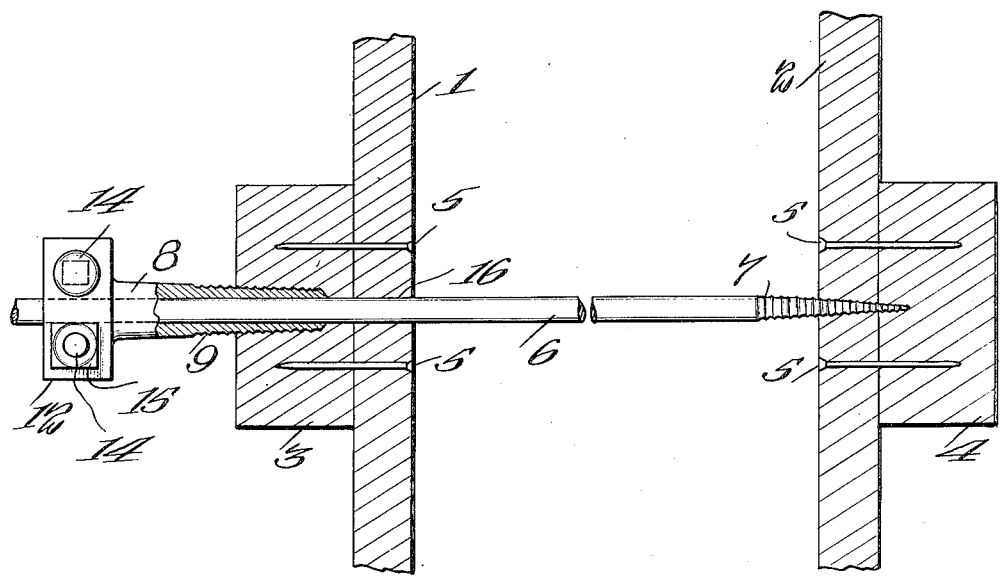
Figure 2:
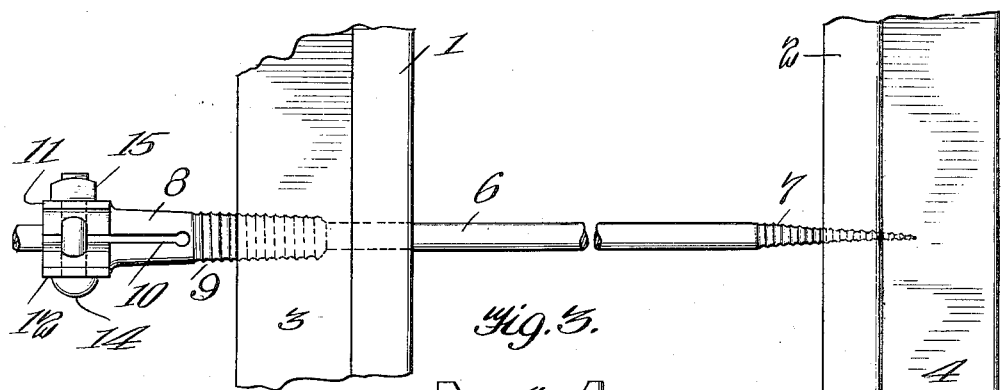
Figure 3:
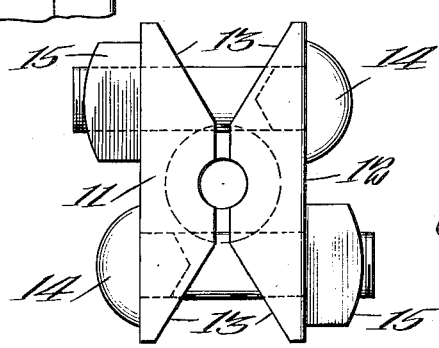

In the drawings: Figure 1 is a transverse vertical section of a portion of a form, showing the bolt in use, and with parts in section; Fig. 2 is a plan view of Fig. 1, and Fig. 3 is an end view of the clamping nut.

The present embodiment of the invention is shown in connection with a form, comprising walls 1 and 2, arranged in parallel spaced relation, and the said walls 1 and 2 are supported by studding 3 and 4 respectively. The studding 3 and 4 are secured to the respective walls by means of nails 5 or the like, and the said walls may be spaced apart at any desired distance. The spacing mechanism comprises a bolt 6 of suitable length, and having one of its ends pointed and threaded, as indicated at 7. The thread of the end 7 is a wood screw thread, the rod or bolt being in fact provided with a gimlet point, and the said point is adapted to enter one wall of the form, and to enter the studding of the said wall through a portion of its thickness.

It will be understood that the spacer bolts are arranged in spaced relation, throughout the length of the form, the spacing depending upon conditions. The gimlet pointed end 7 of the rod is adapted to engage one wall of the form, and the other end of the bolt or rod passes through an opening in the opposite wall, and the said end of the bolt or rod is secured to the said last-named wall, by means of a clamping nut 8. The said nut 8 is in the form of a sleeve having its bore cylindrical to fit the rod or bolt 6, and the external surface of the sleeve is frusto-conical. At the small end of the sleeve, the said sleeve is externally threaded, as shown at 9, the threads being preferably of the same pitch as the threads of the gimlet point 7. The threads 9 extend from the small end of the sleeve approximately half the length of the sleeve, and beyond the threads the said sleeve is slotted longitudinally, as shown at 10, the slots being at opposite sides of the sleeve. At the large end, the sleeve is laterally enlarged, to form clamping heads or jaws 11 and 12, the said heads being separated by the slots 10, before mentioned. Each of the said heads extends on opposite sides of the sleeve, and the adjacent corners of the heads at each end thereof are beveled, as indicated at 13. The heads are perforated transverse to the sleeve, at each end of the heads, and the adjacent perforations are in alinement, and are adapted to receive carriage bolts 14, each of the said bolts being passed through the adjacent ends of the opposite heads and being engaged by nuts 15 to hold the bolts in place.

In the use of the improved spacer bolt, the wall 1 is provided with a transverse opening 16 at one of the studding 3, the said opening extending through the studding, as shown in Fig. 1. The bolt or rod 6 is then passed through the opening 16, and the gimlet pointed end is engaged with the opposite wall 2, and with one of the studding connected therewith. The nut 8 is then engaged with the studding 3 at the opening 16, and is threaded into the said studding a sufficient distance to prevent disengagement thereof, as indicated in Fig. 1. After the nut has been engaged with the studding, the walls are properly spaced, and the nuts 15 are then tightened to clamp the heads or jaws 11 and 12 on the rod or bolt. The slots 10 permit the heads or jaws to move toward each other, and into gripping relation with respect to the rod or bolt, and it will be evident that when the nut 8 is clamped into place the walls 1 and 2 are properly spaced, and are rigidly connected with the spacing bolt, so that there is no possibility of either wall moving toward or from the other. To release the bolts, the nuts 15 are loosened, to permit the clamping jaws or heads to release the bolt or rod 6, after which the nut may be released from the wall 1, and the bolt from the wall 2. The heads may be engaged by any suitable mechanism to turn the same, to cause the threaded end of the nut to engage the opening 16, and the bolt or rod 6 may be also turned by any suitable mechanism. The device will hold the form walls at the required distance apart, and the said walls may be spaced at any distance desired, permitted by the length of the bolt or rod 6.

It will be noted from the drawings, that the bolts 14 are oppositely arranged, so that the nuts 15 are on opposite sides of the nut 8. The threading 9 of the nut 8 is preferably of the same pitch as the pitch of the threads of the end 7 of the rod or bolt, but not necessarily so. When the pitch of the threads is the same, the nut and the gimlet pointed end of the rod or bolt may be simultaneously engaged with or disengaged from the walls.

With the improved spacer bolt, it is not necessary that the form walls be parallel, as the spacing bolts can be used with inclined walls, the said bolts engaging openings and holding the walls as firmly as when the walls are parallel.

I claim:—

1. In combination with the oppositely arranged walls, one of the walls having an opening, of a spacer device comprising a bolt or rod adapted to pass through said opening, said bolt having a gimlet pointed end for engaging the opposite wall, a sleeve nut fitting the bolt or rod and having a frustro-conical external surface, said surface being externally threaded at the small end for engaging the other wall, and the said small end being arranged adjacent to the gimlet pointed end of the rod or bolt, said sleeve having oppositely arranged longitudinally extending slots at the opposite end to the screw threads, and the said nut being enlarged laterally at the slotted end and at each side of the slots to form oppositely arranged gripping jaws or heads, each of the said heads being beveled at each end at the inner side thereof and having an opening at each end, the said openings being in alinement, bolts passing through the openings, the bolts being oppositely arranged, and nuts engaging the bolts for clamping the slotted end of the sleeve on the rod or bolt.

2. In combination with the oppositely arranged walls, one of the walls having an opening, of a spacer device comprising a bolt or rod adapted to pass through said opening, said bolt having a gimlet pointed end for engaging the opposite wall, a sleeve nut fitting the bolt or rod and having a frustro-conical external surface, said surface being externally threaded at the small end for engaging the other wall, and the said small end being arranged adjacent to the gimlet pointed end of the rod or bolt, said sleeve having oppositely arranged longitudinally extending slots at the opposite end to the screw threads, and the said nut being enlarged laterally at the slotted end and at each side of the slots to form oppositely arranged gripping jaws or heads, and means for clamping the said heads on the rod or bolt.

3. A device of the character specified, comprising a rod or bolt having one of its ends gimlet pointed, a sleeve nut fitting the rod or bolt and having its external surface frusto-conical and arranged with the small end toward the gimlet pointed end of the rod or bolt, said sleeve being externally threaded at the small end and having oppositely arranged longitudinally extending slots at the opposite end, said nut being enlarged laterally at the slotted end on each side of the slots to form gripping jaws or heads, said jaws or heads being beveled at each end on their inner faces, and having openings at each end, the said openings of the heads registering, bolts passing through the openings, the said bolts being oppositely arranged, and nuts engaging the bolts for clamping the heads on the rod or bolt.

4. In a device of the character specified, comprising a rod or bolt having one of its ends gimlet pointed, a sleeve nut fitting the rod or bolt and having its external surface frusto-conical and arranged with the small end toward the gimlet pointed end of the rod or bolt, said sleeve being externally threaded at the small end and having oppositely arranged longitudinally extending slots at the opposite end, said nut being enlarged laterally at the slotted end on each side of the slots to form gripping jaws or heads, said jaws or heads being beveled at each end on their inner faces, and means for clamping the latches on the rod or bolts.

5. A device of the character specified, comprising a rod or bolt having one of its ends gimlet pointed, a sleeve nut fitting the rod or bolt and having its external surface frusto-conical and arranged with the small end toward the gimlet pointed end of the rod or bolt, said sleeve being externally threaded at the small end and having oppositely arranged longitudinally extending slots at the opposite end, said nut being enlarged laterally at the slotted end on each side of the slots to form gripping jaws or heads, and means for clamping the heads on the rod or bolts.

6. A device of the character specified, comprising a rod or bolt having one of its ends pointed and screw threaded, a sleeve nut slidable on the rod and having the end adjacent to the threaded end of the rod externally threaded, and having the opposite end longitudinally slotted, said sleeve nut being enlarged laterally at the end adjacent to the slot and on each side thereof to form oppositely arranged gripping jaws for engaging the rod or bolt, and means for clamping the said jaws on the rod or bolt.

7. A device of the character specified, comprising a rod or bolt having one of its ends pointed and screw threaded, a sleeve nut slidable on the rod and having the end adjacent to the threaded end of the rod externally threaded, and having the opposite end provided with oppositely arranged longitudinally extending slots, and means at the slotted end of the nut for clamping the nut on the rod or bolt.

8. A device of the character specified, comprising a rod or bolt having one end screw-threaded, a sleeve nut slidable on the rod and having the inner end thereof externally threaded, the opposite end of the sleeve being slotted longitudinally, and means for clamping the said end of the sleeve on the rod or bolt.

GEORGE COUSINS.

Witnesses:
HARRY C. MIGEN,
JOHN TIERNAN.